United States Patent [19]

Hollopeter et al.

[11] Patent Number: 5,546,651
[45] Date of Patent: Aug. 20, 1996

[54] APPARATUS FOR ENCAPSULATING SPACE LAUNCH PAYLOADS

[75] Inventors: James E. Hollopeter; Tsvi H. Estline, both of San Diego; Robert L. Barton, Bonita, all of Calif.

[73] Assignee: Lockheed Martin Corporation, Denver, Colo.

[21] Appl. No.: 283,622

[22] Filed: Aug. 1, 1994

[51] Int. Cl.$^6$ .................................................. B23P 21/00
[52] U.S. Cl. ................................ 29/722; 29/791; 29/822; 414/292
[58] Field of Search ............................. 29/428, 429, 430, 29/722, 791, 822; 52/66, 192, 197; 414/292

[56] References Cited

U.S. PATENT DOCUMENTS

| | | | |
|---|---|---|---|
| 2,722,171 | 11/1955 | Deringer | 52/197 X |
| 4,057,295 | 11/1977 | Liet et al. | 52/192 X |
| 4,771,998 | 9/1988 | Rogge et al. | 29/722 X |
| 4,923,352 | 5/1990 | Tamura et al. | 29/722 X |
| 4,930,213 | 6/1990 | Hayakawa et al. | 49/430 X |

*Primary Examiner*—Joseph M. Gorski
*Attorney, Agent, or Firm*—John R. Duncan; Frank D. Gilliam

[57] ABSTRACT

A method and apparatus for encapsulating a payload in a shroud and mounting the resulting assembly on a launch vehicle. An encapsulation cell is provided for containing a payload to be encapsulated in a shroud. That cell is maintained at a "clean room" level of cleanliness. A shroud having a cleaned and sealed interior is placed on the roof in a vertical orientation. A seal arrangement seals between the shroud near its lower end and the roof, creating an airlock. The roof panels below the shroud are opened and the payload is lifted into the shroud through the opening and secured in the shroud. The opening is then closed, the seal retracted and the assembly of payload and shroud moved to a bay where it is mated to a space launch vehicle. This cell and encapsulation system eliminates the need to clean the shroud exterior and any need for a very large clean room cell to house the payload, shroud and lifting device. Ideally, several clean rooms are provided adjacent to the cell for assembling and testing payloads, with a clean room aisle for moving payloads from the assembly rooms to the cell. Also, several launch vehicle assembly bays may be provided for mating shroud and payload assemblies on launch vehicles and performing the required tests prior to moving the complete launch vehicle to a launch pad. One encapsulation cell can service several payload assembly facilities and launch vehicle assembly facilities.

7 Claims, 2 Drawing Sheets

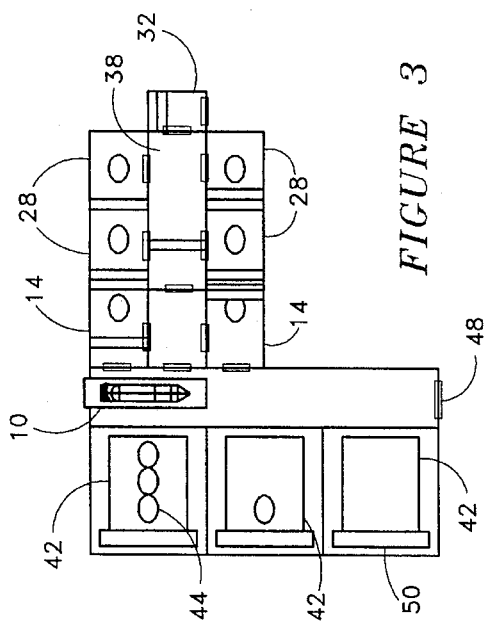
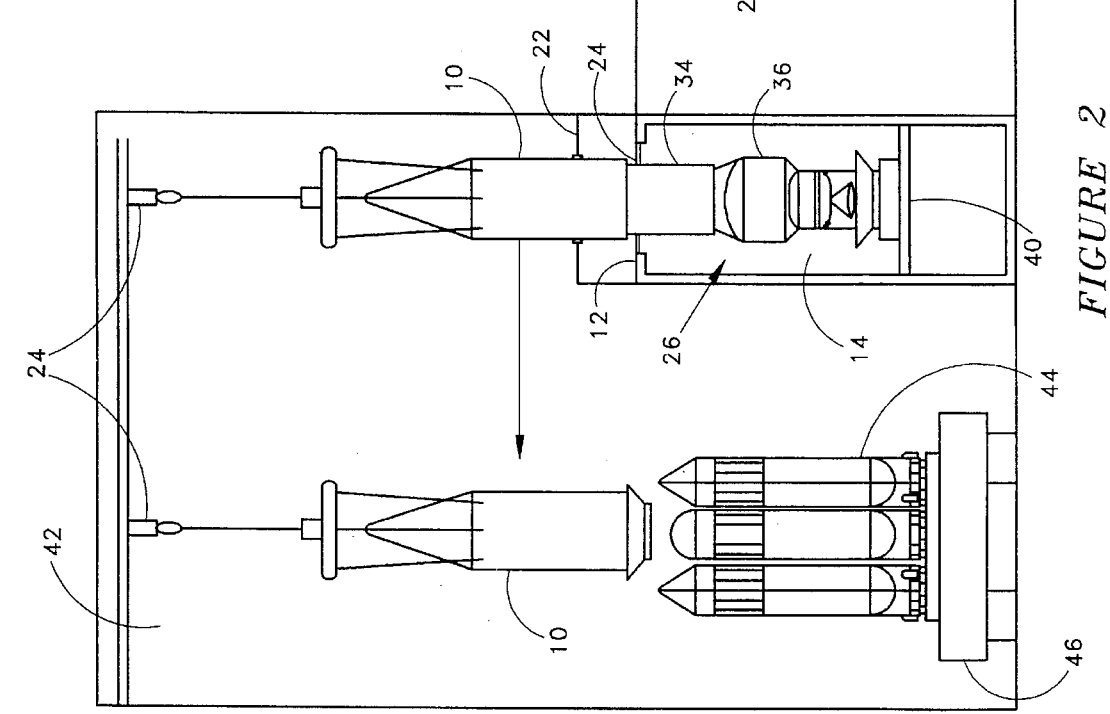

5,546,651

APPARATUS FOR ENCAPSULATING SPACE LAUNCH PAYLOADS

BACKGROUND OF THE INVENTION

This invention relates in general to space launch systems and, more particularly, to a simplified method and apparatus for encapsulating a payload in a payload shroud for mounting on a space launch vehicle for launch.

In conventional payload encapsulation, a spacecraft or other payload and a containment shroud are brought together in an environmentally clean area. Both the payload and the shroud interior and exterior areas must be cleaned to the acceptable cleanliness level prior to entering the encapsulation clean room.

The required level of cleanliness is very high, so that the cost in time and expense in cleaning both the interior and exterior of the shroud is significant. It is important in the increasingly competitive space launch industry to minimize costs and reduce launch preparation time.

Many payloads are very large, requiring very large, tall, shrouds. The encapsulation clean room must have sufficient height to permit the shroud to be lifted vertically above the payload, then carefully lowered thereover. For very large payloads and shrouds, the clean room height would be in the 400 to 500 foot range, necessarily more than double the height of the payload. The shroud must be cleaned inside and outside before it may enter the clean room. Much of the clean room height is not required for any purpose other than the shroud emplacement. The larger clean room is more difficult and expensive to build and maintain at the required cleanliness level. The requirement that the interior and exterior of the shroud be cleaned increases the cost, complexity and schedule time of the payload encapsulation process.

Thus, there is a continuing need for more efficient and cost effective methods and apparatus for encapsulating payloads in shrouds for space launch.

SUMMARY OF THE INVENTION

The above-noted problems, and others, are overcome in accordance with this invention by a method and apparatus for encapsulating a payload in a shroud and mounting the resulting assembly on a space launch vehicle which basically comprises a payload encapsulation cell sized to hold only the payload and related test equipment, with means for maintaining a selected degree of cleanliness within the cell. The cell roof structure is capable of supporting a shroud and the payload. It includes an interlocked room and a sealing arrangement around the lower circumference of a shroud when the shroud is placed on the roof. A selectively openable access opening through the roof provides access to the shroud internal volume from the encapsulation cell which is under it. The internal surface of the shroud is cleaned and the shroud is sealed prior to shipping the shroud to the encapsulation cell.

With a payload in the cell, a shroud is placed on the roof and attached to fixtures which assure alignment with the payload. The seal mechanism is activated to seal around the shroud near the lower edge. The volume of air in the interlock between the roof and the seal is circulated and cleaned to the selected degree of cleanliness. The cover over the shroud underside opening is then removed. The access opening in the roof is opened and the payload is inserted into the shroud, by a conventional elevator or other lift. The payload is secured in the shroud and any necessary tests are performed. When the payload encapsulation is complete, the access opening is closed and the airlock seal is released. The assembly of payload and shroud can then be lifted away for storage or, preferably, is lifted directly to an adjacent bay containing a launch vehicle and the shroud is mated to the launch vehicle.

Preferably, to support desired launch rate requirements, a number of payload processing clean rooms are provided adjacent to the encapsulation cell. The payloads can be moved on air bearing pallets or the like into the cell without losing the required cleanliness level. Also, a number of vehicle final assembly bays may be provided adjacent to the encapsulation cell. The encapsulated payload can be lifted from the roof of the encapsulation cell to any of the vehicle final assembly bays for mating with launch vehicles. With this overall arrangement, the payload processing clean rooms and transfer aisles can be in a low bay building. For large payloads, the typical low bay height is about 200 feet. The required high bay areas typically having heights of about 400 feet, do not have to meet clean room standards. The high bay is required for final assembly of the launch vehicle which must have sufficient height to mate the launch vehicle with the encapsulated payload, including the area over the encapsulation cell.

BRIEF DESCRIPTION OF THE DRAWING

Details of the invention, and of preferred embodiments thereof, will be further understood upon reference to the drawing, wherein:

FIG. 2 is an elevation view of payload preparation rooms, encapsulation cell and a launch vehicle mating bay; and FIG. 3 is a schematic plan view of the layout of encapsulation cell and associated facilities.

DETAILED DESCRIPTION OF PREFERRED EMBODIMENTS

Figure 1:
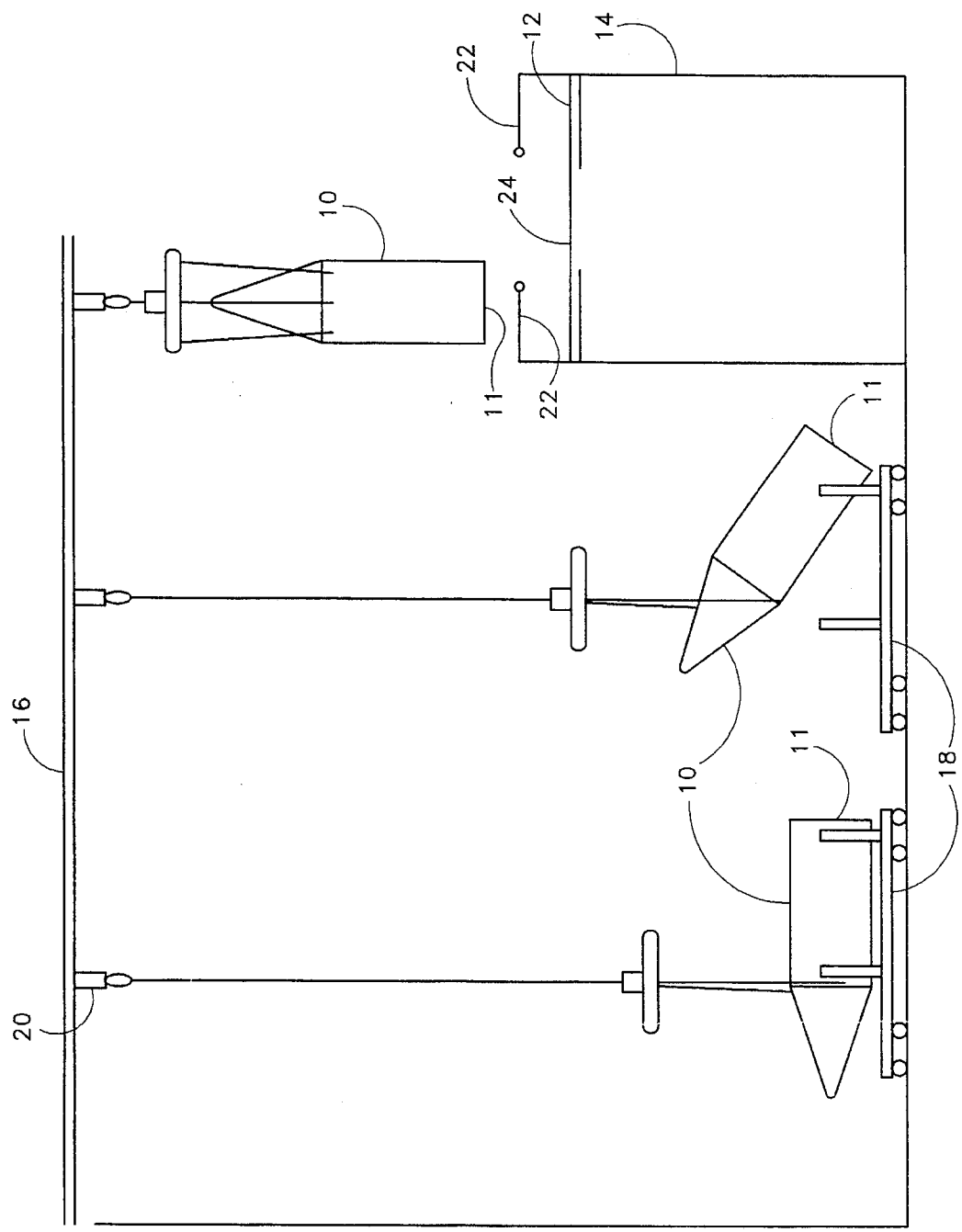
FIG. 1 is a schematic elevation view showing installation of a shroud on a payload encapsulation cell.

FIG. 1 shows, in schematic elevation, the positioning of a shroud 10 on the roof 12 of an encapsulation cell 14. A shroud 10 which was cleaned inside and sealed with a cover seal 11 to maintain cleanliness is moved into a high bay building 16 on a conventional dolly or trailer 18. A conventional traveling crane 20 lifts shroud 10 to an upright position, then lifts the shroud vertically, moves the shroud over the center of roof 12 and places the shroud thereon.

Once shroud 10 is placed on roof 12, a seal ring 22 is moved into tight, substantially air-tight, sealing engagement with the exterior cylindrical surface of shroud 10 creating an airlock. The volume of air in the airlock is kept at positive pressure, so that any leakage past the seal will be outward. The height of the seal ring 22 from the surface of roof 12, is typically ten feet, to keep to a minimum the headroom and air volume in the airlock, which must be kept at the required cleanliness level.

Any suitable seal means may be used in seal ring 22. Typically, two sliding panels with half-circle cut-outs and having a sealing surface, such as a pneumatic inflated tube or a compressible foam at the sealing surface, are simply moved together around the shroud to seal the surface. If desired, multiple seal panels, arranged similar to a conventional camera between-the-lens iris diaphragm may be used.

The sealing surfaces will be shaped to accommodate any surface irregularities on shroud 10.

Once sealing is complete and the volume in the airlock between seal ring 22 and roof 12 has been cleaned to the required extent the seal cover 11 is removed from the shroud 10. The panel 24 is opened, such as by folding back a folding panel, sliding back slidable panels, etc. to provide free access to the interior of shroud 10 from the interior of encapsulation cell 14.

The apparatus for, and method of, loading a payload 26 into shroud 10 are illustrated in FIG. 2.

Payload 26 is typically brought into an assembly clean room 28 on an air pallet 30 via an air lock 32. Clean room 32 (and subsequent rooms) are maintained at a selected degree of cleanliness to prevent contamination of the payload. Typically, the clean room level is 100,000 per Federal Specification No. 209 for clean rooms.

The payload is assembled, tested, etc., in assembly room 28. Typically, as seen, the cargo 34, which may be a communications satellite, interplanetary scientific satellite or the like, is mated to an upper stage 36, such as a Centaur high energy upper stage.

Once the payload 26 is assembled and checked out, it is moved along a transfer aisle 38 to encapsulation cell 14, which are also maintained at the required cleanliness level. A conventional elevator 40 then lifts payload 26 into shroud 10 where it is secured in place. Once encapsulation is complete and the assembly is checked out, panel 24 in roof 12 is closed and seal 22 is retracted. Shroud 10 is lifted and moved to high bay launch vehicle assembly building 42 and placed on launch vehicle 44. After assembly and all required mating tests are complete, the all up launch vehicle is moved to the launch pad on transporter 46.

As seen in FIG. 3, several payload assembly bays 28 may be provided, all serviced by one transfer aisle 38 and one entrance airlock 32. Typically, two encapsulation cells 14 may be provided and multiple launch vehicle assembly buildings 42 may be used. Some of these facilities require more vehicle or payload processing time than others. A greater number of the high time requirement facilities will be provided to assure an optimum flow of components. Only the area above the encapsulation cells 14, transfer aisle 48 and the launch vehicle assembly area 42 need to be high-bay. Much lower, less expensive buildings may be used for the air lock 32, payload assembly clean room 28 and encapsulation cell 14. Further, all clean room facilities are in the low bay area, simplifying maintaining the required degree of cleanliness in these smaller volume facilities.

In operation, as seen in FIG. 3, payloads enter through air lock 32 and aisle 38 to an assembly room 28 for assembly and testing, then are moved to an encapsulation cell 14. Meanwhile, a shroud 10 on its transporter enters through door 48 into a non-cleanliness-restricted area. The shroud is erected, moved to the roof of the encapsulation cell and the payload is lifted thereinto and encapsulated. The shroud is then moved to, and mated with, a launch vehicle 44 in one of the assembly buildings 42. Upon completion of vehicle assembly, the transporter moves through door 50 to the launch pad.

While certain preferred materials, dimensions and arrangements have been described in detail in conjunction with the above description of preferred embodiments, those can be varied, where suitable, with similar results. Other applications, variations and ramifications of this invention will occur to those skilled in the art upon reading this disclosure. Those are intended to be included within the scope of this invention as defined in the appended claims.

I claim:

1. Apparatus for encapsulating a payload in a shroud and mounting the resulting assembly on a launch vehicle which comprises:

a cargo encapsulation cell having a generally clean interior;

said encapsulation cell having a roof structure capable of supporting a shroud, payload and supporting fixtures;

sealing means for engaging a shroud on said roof adjacent to said roof forming an airlock to said encapsulation cell;

selectively openable access means in said roof for providing access into said shroud through said cell roof; and means for inserting a payload in said encapsulation cell into said shroud.

2. The apparatus according to claim 1 further including at least one clean room adjacent to said encapsulation cell for assembly of said payload and means for moving said payload from said clean room to said encapsulation cell.

3. The apparatus according to claim 1 further including at least one bay adjacent to said encapsulation cell for containing a vertical launch vehicle and means for moving a shroud containing said payload from said encapsulation cell roof to said adjacent bay for mating said shroud with said launch vehicle.

4. The apparatus according to claim 1 wherein said means for inserting a payload into said shroud includes an elevator to raise said payload through said access opening into said shroud.

5. Apparatus for encapsulating a payload in a shroud and mounting the resulting assembly on a launch vehicle which comprises:

a cargo encapsulation cell having a generally clean interior;

at least one assembly clean room adjacent to said encapsulation cell for assembly of a payload while maintaining a clean environment;

an aisle for moving said payload from said assembly room to said encapsulation cell while maintaining said clean environment;

said encapsulation cell having a roof structure capable of supporting a shroud, payload and supporting fixtures;

sealing means for engaging a shroud on said roof adjacent to said roof forming an airlock to said encapsulation cell;

selectively openable access means in said roof for providing access into said shroud through said cell roof; and means for inserting a payload in said encapsulation cell into said shroud.

6. The apparatus according to claim 5 further including at least one bay adjacent to said encapsulation cell for containing a vertical launch vehicle and means for moving a shroud containing said payload from said encapsulation cell roof to said adjacent bay for mating said shroud with said launch vehicle.

7. The apparatus according to claim 5 wherein said means for inserting a payload into said shroud includes an elevator to raise said payload through said access opening into said shroud.

\* \* \* \* \*